(12) United States Patent
Lin

(10) Patent No.: US 7,835,845 B2
(45) Date of Patent: Nov. 16, 2010

(54) METHOD AND SYSTEM FOR CONSISTENT BRAKING CONTROL

(75) Inventor: William C. Lin, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 169 days.

(21) Appl. No.: 11/844,278

(22) Filed: Aug. 23, 2007

(65) Prior Publication Data
US 2009/0055064 A1 Feb. 26, 2009

(51) Int. Cl.
G06F 19/00 (2006.01)

(52) U.S. Cl. ............... 701/70; 701/48; 701/71; 701/75; 701/80; 180/290; 303/132; 303/198; 303/22.1

(58) Field of Classification Search ............ 701/70, 701/71, 75, 80, 48; 180/290; 303/22.1, 132, 303/198

See application file for complete search history.

(56) References Cited

U.S. PATENT DOCUMENTS

| 4,743,072 | A | * | 5/1988 | Brearley | 303/15 |
| 5,002,343 | A | * | 3/1991 | Brearley et al. | 303/7 |
| 5,011,236 | A | * | 4/1991 | Toepfer et al. | 303/198 |
| 5,033,002 | A | * | 7/1991 | Sol | 701/90 |
| 5,043,896 | A | * | 8/1991 | Sol | 701/80 |
| 5,132,906 | A | * | 7/1992 | Sol et al. | 701/80 |
| 5,632,530 | A | * | 5/1997 | Brearley | 303/22.1 |
| 6,167,354 | A | * | 12/2000 | Maleki et al. | 702/147 |
| 6,332,354 | B1 | * | 12/2001 | Lalor et al. | 73/121 |
| 6,460,943 | B1 | * | 10/2002 | Toepfer et al. | 303/155 |
| 2002/0133282 | A1 | * | 9/2002 | Ryan et al. | 701/70 |
| 2004/0026992 | A1 | * | 2/2004 | Villaume | 303/126 |
| 2005/0065693 | A1 | * | 3/2005 | Wang et al. | 701/70 |

* cited by examiner

Primary Examiner—Jack Keith
Assistant Examiner—Rami Khatib

(57) ABSTRACT

Brake pedal input is modulated to produce a consistent relationship between the brake pedal input and a deceleration of the vehicle.

18 Claims, 3 Drawing Sheets

METHOD AND SYSTEM FOR CONSISTENT BRAKING CONTROL

TECHNICAL FIELD

This disclosure is related to a braking system in a motor vehicle.

BACKGROUND

A vehicle operator has an expectation that a particular depression of a brake pedal will result in a particular deceleration of the vehicle. If braking conditions are such that the vehicle requires more braking force than usual to decelerate, an operator may not correctly anticipate the added application of force required to decelerate the vehicle. Upon realizing an urgent need to increase braking force, the driver may apply excess force to the brake pedal, thereby greatly increasing the opportunity for the wheels of the vehicle to lock up or lose lateral stability as the vehicle slows.

It is, therefore, desirable to provide a method of braking control whereby performance of a braking system to decelerate a vehicle is controlled to produce a consistent relationship between a brake pedal input and vehicle deceleration irrespective of braking conditions, such as road slope or vehicle loading.

SUMMARY

A method for controlling braking in a vehicle includes receiving a brake pedal input, modulating this brake pedal input by a feedback gain and a feed forward gain to create a modulated brake pedal input, and braking the vehicle based upon the modulated brake pedal input. The modulated brake pedal input is operative to produce a consistent relationship between the brake pedal input and a deceleration of the vehicle.

BRIEF DESCRIPTION OF THE DRAWINGS

One or more embodiments will now be described, by way of example, with reference to the accompanying drawings, in which.

DETAILED DESCRIPTION

Figure 1:
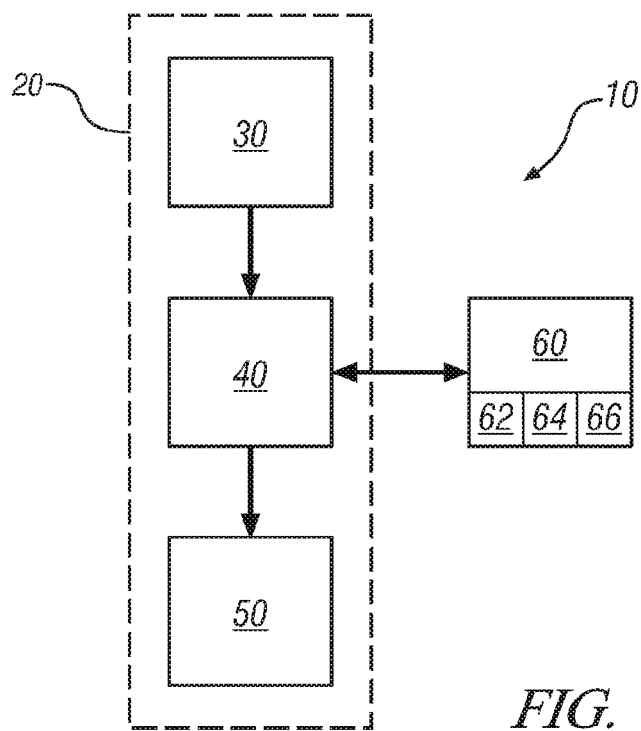
FIG. 1 is a schematic diagram illustrating an exemplary embodiment of a vehicle utilizing a braking system in accordance with the present disclosure.

Referring now to the drawings, wherein the showings are for the purpose of illustrating certain exemplary embodiments only and not for the purpose of limiting the same, FIG. 1 depicts a vehicle 10 which has been constructed in accordance with an embodiment of the disclosure. Vehicle 10 includes a braking system 20 to effectuate braking control for vehicle 10. Braking system 20 includes brake pedal system 30, brake control module 40, and braking-torque generating system 50. Brake pedal system 30 is the user interface for the operator of the vehicle to decelerate vehicle 10. In a preferred embodiment, brake pedal system 30 is an electronically actuated interface which translates pedal depression to an electronic signal in the form of a brake pedal input signal. In return for depression of the pedal, the operator receives a force feedback return as a means of indicating to the operator the level to which the pedal is depressed. Greater pedal depression by the operator causes the brake pedal input value to increase and returns a higher force feedback. Brake control module 40 includes a processor operable to receive the brake pedal input and generate a modulated brake pedal input. This modulated brake pedal input is operative to control braking-torque generating system 50. Braking-torque generating system 50 includes mechanisms located at some or all of the wheels of vehicle 10 which translate the electronic braking control signal into a mechanical force such as, for example, a caliper and rotor system. A preferred embodiment of braking-torque generating system 50 includes electrically actuated calipers. Another preferred embodiment of braking-torque generating system 50 utilizes anti-lock braking mechanisms.

Both road slope and vehicle loading have effects upon the braking operation of vehicle 10. A vehicle going downhill, with the same braking action applied by braking-torque generating system 50, may take much longer to stop than a vehicle going on a level road. Likewise, a heavily loaded vehicle, with the same braking action applied by braking-torque generating system 50, may take much longer to stop than a lightly loaded vehicle. Known systems apply a particular braking action for a particular brake pedal input; therefore, with the same pedal input, a known vehicle will take much longer to stop under adverse braking conditions than it would normally. If an operator fails to anticipate the need for more aggressive brake pedal input force to account for vehicle load or road grade conditions, a longer than anticipated stopping distance may result. The present disclosure applies an algorithm utilizing feedback control and a feed forward control to compensate for varying braking conditions.

Information related to varying brake conditions such as road slope and vehicle loading is developed from data system 60. Data system 60 includes modules operable to provide data inputs related to the operation of vehicle 10 to brake control module 40. Data system 60 generates data related to the road slope on which vehicle 10 is traveling. Road slope for vehicle 10 may be quantified through the use of a slope indication system 64 or a global positioning system 66. Slope indication system 64 includes devices and methods capable of measuring the inclination angle of the vehicle with respect to level. Global positioning system 66 may generate road slope data through lookup values for a given section of road. A preferred embodiment utilizes slope indication system 64 and global positioning system 66 together to increase accuracy of the road slope data.

Vehicle loading encompasses forces applied to vehicle 10, and include effects of mass within the vehicle, objects placed under tow, wind and drag forces, and other such factors. A load adaptation factor may be estimated based upon the net difference between actual braking operation of the vehicle and expected braking operation for a given brake pedal input. This net difference in braking operation may be calculated by processing data related to braking deceleration of vehicle 10. Deceleration data is generated by data system 60 through the use of accelerometer 62 or global positioning system 66. Accelerometer 62 is a device that measures the rate of change of speed for an object. Global positioning system 66 generates a detailed location of vehicle 10 at any time. Deceleration or negative acceleration is a simple second order function of location data, and any processor, such as the processor in brake control module 40 or a processor resident to global positioning system 66, can generate deceleration data on the basis of a stream of vehicle location data. A preferred embodiment utilizes accelerometer 62 and global positioning system 66 together to increase accuracy of the deceleration data.

As aforementioned, brake control module 40 utilizes a feedback control system and a feed forward control system to compensate or modulate the brake pedal input for varying road slope and vehicle loading. Feedback control systems are systems which generate an output, and then the output of the system is analyzed and fed back to modify the parameters of the system to correct the output toward a desired reference value. Through feedback control, a system may be corrective: as outputs are iteratively generated, the system is modified to drive down the error between the output and the reference value.

As applied to braking system 20, feedback control may be utilized to correct for recurring anomalies in the braking of vehicle 10. For example, a vehicle containing excess mass due to a heavy load will consistently take longer to stop than a vehicle with normal mass under the same conditions. A feedback control system within a brake control module 40 evaluates errors between actual braking performance data and expected braking performance from reference data for a given brake pedal input, and the feedback control system adds a compensation factor in the form of feedback gain to the brake pedal input to reduce future braking errors.

While feedback systems correct errors based upon the output of the system, feed forward systems react to varying inputs in the braking conditions before any output results are generated. By comparing these operating conditions to typical values, the system may anticipate the effects of the variant conditions upon system performance. For instance, a unit may have a lookup table estimating that an environmental temperature of twenty degrees above normal will require an increase of X % to parameter A to maintain a normal output. In this way, a feed forward system may adjust proactively, not allowing the output to suffer initial errors before adjusting. Feed forward systems frequently incorporate machine learning algorithms. Machine learning algorithms are algorithms that adjust internal parameters incrementally over numerous system cycles to a certain input reading. If this particular input is consistently lower than an anticipated default value, the parameters of the algorithm can be slowly adjusted to fit this lower input value in advance. If an input varying by a certain amount from a typical value tends to produce results with a predictable error, the algorithm can be adjusted to anticipate and correct for the error. By utilizing these techniques, a feed forward system may reduce output errors of a system by taking variable inputs into account.

Applied to the present disclosure, a feed forward control system is utilized to anticipate the effects of road slope and vehicle loading upon braking system 20. The algorithm within brake control module 40 receives inputs related to road slope and vehicle loading. The road slope input from data system 60 is processed by brake control module 40 to develop a road slope factor. Input related to vehicle deceleration is used to estimate the load adaptation factor. Together, the road slope factor and the load adaptation factor are applied to the brake pedal input as a feed forward gain.

Figure 2:
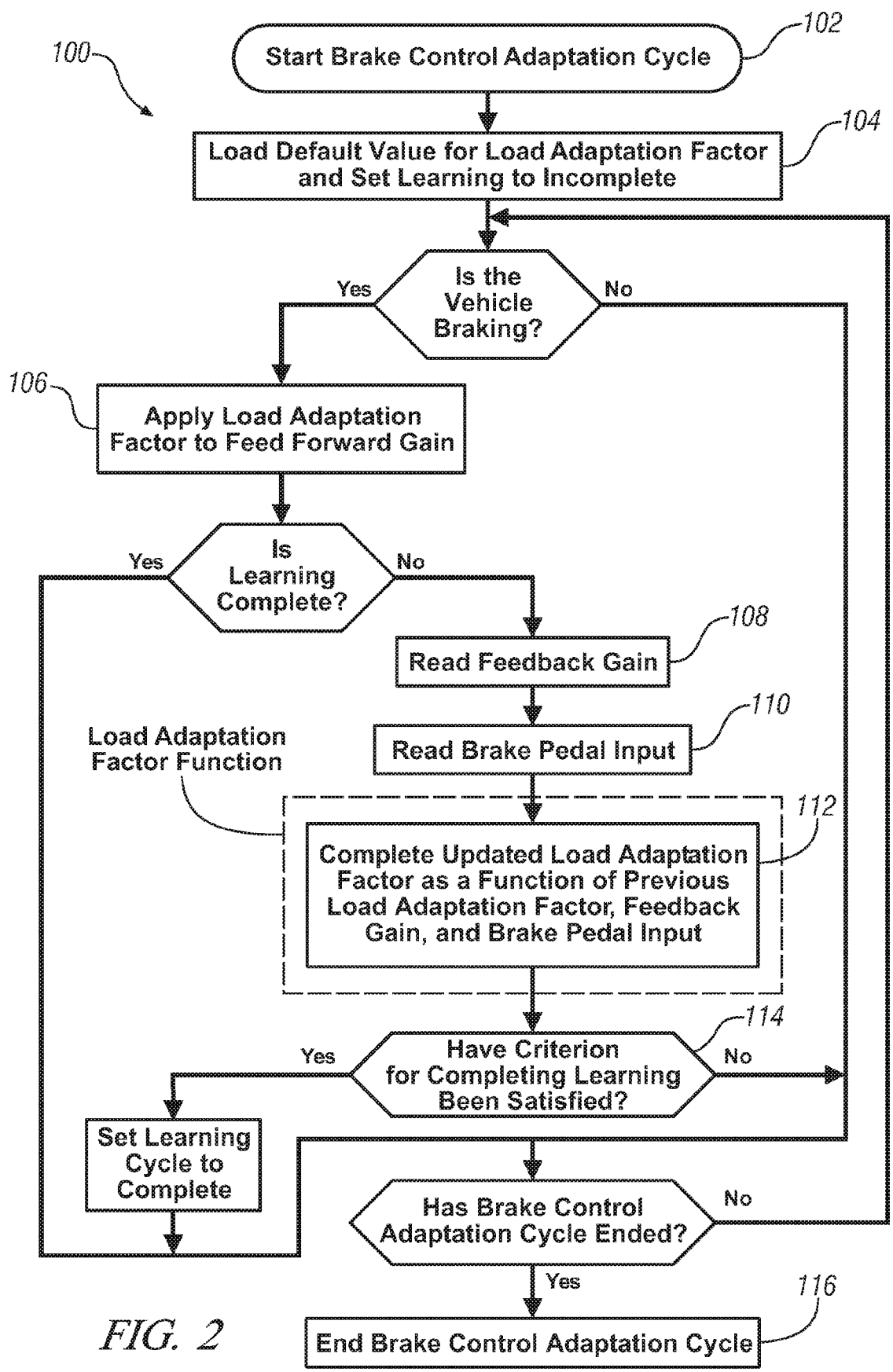
FIG. 2 is a flowchart illustrating an exemplary embodiment of a method of determining a load adaptation factor in accordance with the present disclosure.

FIG. 2 is a flowchart representing process 100 detailing the calculation of the load adaptation factor in accordance with an exemplary embodiment of the disclosure. The load adaptation factor of process 100 is developed for use throughout a particular time span. The time span or cycle through which the load adaptation factor corresponding to a given set of input data is used begins at step 102 and is defined as a brake control adaptation cycle. The duration of this brake control adaptation cycle may vary from a single depression of the brake pedal to the life of the vehicle. A preferred embodiment of the brake control adaptation cycle duration is a single key cycle, beginning when the vehicle is turned on and ending when the vehicle is turned off. This embodiment of the duration of the brake control adaptation cycle may be advantageous because usage and loading of a particular vehicle tend to vary most significantly between key cycles and tend to remain comparatively static during key cycles. Other embodiments of the duration could include brake control adaptation cycles identified with particular uses of vehicle 10, such as when an object is in tow, or individual brake control adaptation cycles maintained and keyed to particular operators.

Within a given brake control adaptation cycle, the load adaptation factor is determined through a learning cycle. At step 104 corresponding to the initiation of a brake control adaptation cycle, a default value for the load adaptation factor is loaded and a learning value is initially set to incomplete. In one embodiment, the default value for the load adaptation factor is a pre-set lookup value, for example a value corresponding to nominal conditions (i.e. level grade and nominal load). In another embodiment, the default value of the load adaptation factor is the last load adaptation factor value used during the previous brake control adaptation cycle. As vehicle 10 brakes for the first time in the brake control adaptation cycle, the default value for the load adaptation factor is applied to the feed forward gain at step 106. Because the learning cycle is initially set to incomplete, a learning cycle comprising steps 108 through 114 is initiated. Values for feedback gain from the feedback control system and brake pedal input are read at steps 108 and 110, respectively, and these values are then fed through a load adaptation factor function at step 112 to generate an updated load adaptation factor. Recalling that feedback gain is developed as a response to errors in deceleration performance data as compared to expected or reference values for a given brake pedal input, trends in the feedback gain indicating trends in braking performance may be used to estimate non-nominal forces acting upon the vehicle during braking events. These non-nominal forces cause a net loading effect upon vehicle 10 during braking events, and data regarding these non-nominal forces may be processed to estimate the load adaptation factor. The load adaptation factor function used at step 112 to develop the load adaptation factor may take many forms, may require multiple iterations of the learning cycle to improve accuracy of the estimation, and may include machine learning algorithms. One preferred embodiment of the load adaptation factor function is described below and in FIG. 3. The load adaptation factor is updated through the load adaptation factor function and is available to be applied in the next braking event at step 106 unless the brake control adaptation cycle ends at step 116.

After the load adaptation factor is updated in step 112, step 114 then determines whether certain criteria are met such that the learning value should be set to complete. If the learning value is set to complete, no further updates to the load adaptation factor are performed for the remainder of the brake control adaptation cycle. If the learning value remains incomplete, then the learning cycle reiterates at the next braking event. The criteria for defining the number of iterations required to set the learning value to complete can be based on several factors: a single iteration can be used if testing shows that the first iteration is usually accurate for a particular vehicle application; multiple iterations can be utilized for a vehicle with complex characteristics or for a vehicle that changes load characteristics over the span of a brake control adaptation cycle. A preferred embodiment utilizes a pre-set fixed learning counter set to determine a set number of learning cycle iterations to be run for each brake control adaptation cycle. Another embodiment could track changes in the load adaptation factor and set the learning value to complete only when updates become small from iteration to iteration. Many embodiments of the criteria for setting the learning value to complete are envisioned, and the disclosure should not be limited to the exemplary embodiments described herein.

Figure 3:
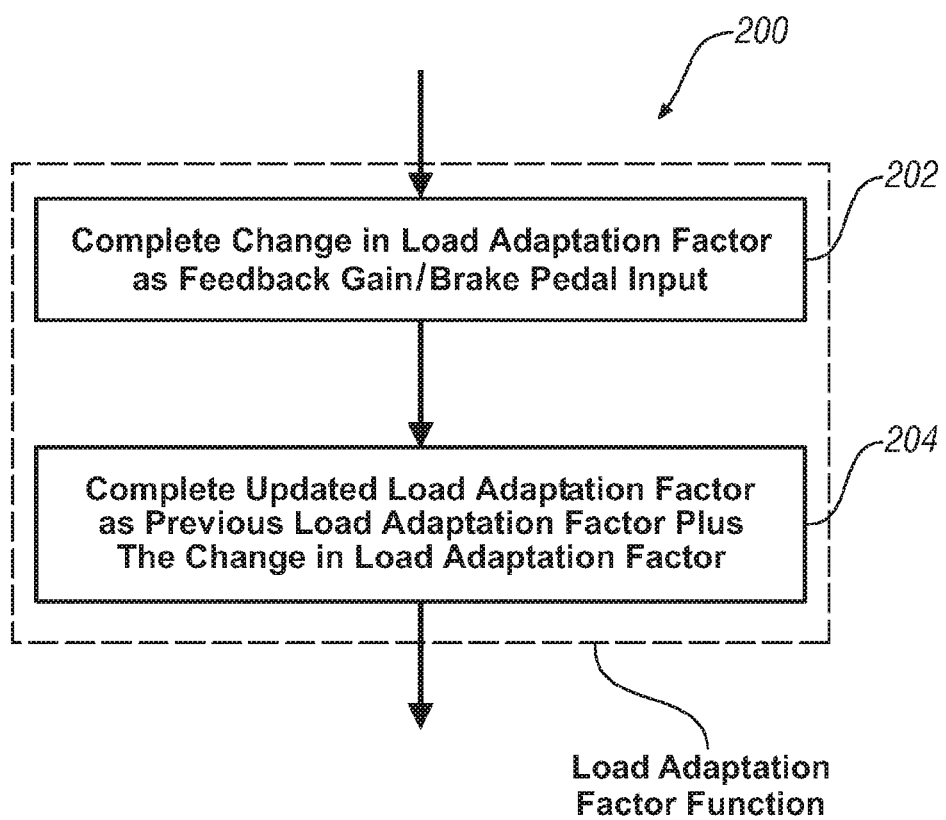
FIG. 3 is a flowchart illustrating an exemplary embodiment of an element shown in the flowchart illustrated in FIG. 3 in accordance with the present disclosure.

FIG. 3 illustrates an exemplary embodiment that the load adaptation factor function as described in FIG. 2, step 112, may take in accordance with the disclosure. As process 200, this embodiment of the load adaptation factor function receives feedback gain and brake pedal input as inputs and produces an updated load adaptation factor. Step 202 computes a change in load adaptation factor as the feedback gain divided by the brake pedal input. Step 204 computes an updated load adaptation factor by adding the change in load adaptation factor computed in step 202 to the previous load adaptation factor. The previous load adaptation factor is the value that was most recently used as the load adaptation factor in step 106. In this way, an updated load adaptation factor is generated to be used during the next braking cycle.

In any depression of the brake pedal, the feedback control gain and the feed forward control gain are applied by brake control module 40 to the brake pedal input to generate a modulated brake pedal input. The modulated brake pedal input corresponds to a particular intention of the operator to decelerate vehicle 10 at a typical rate and culminates in braking forces being generated in accordance with the magnitude of the modulated brake pedal input. Brake control module 40, utilizing the feedback control system and the feed forward control system described above, receives the brake pedal input and corrects the operation of braking system 20 in order to normalize the distance required to stop vehicle 10 as closely as possible to the distance required to stop the same vehicle in a nominally loaded condition on a flat road.

Figure 4:
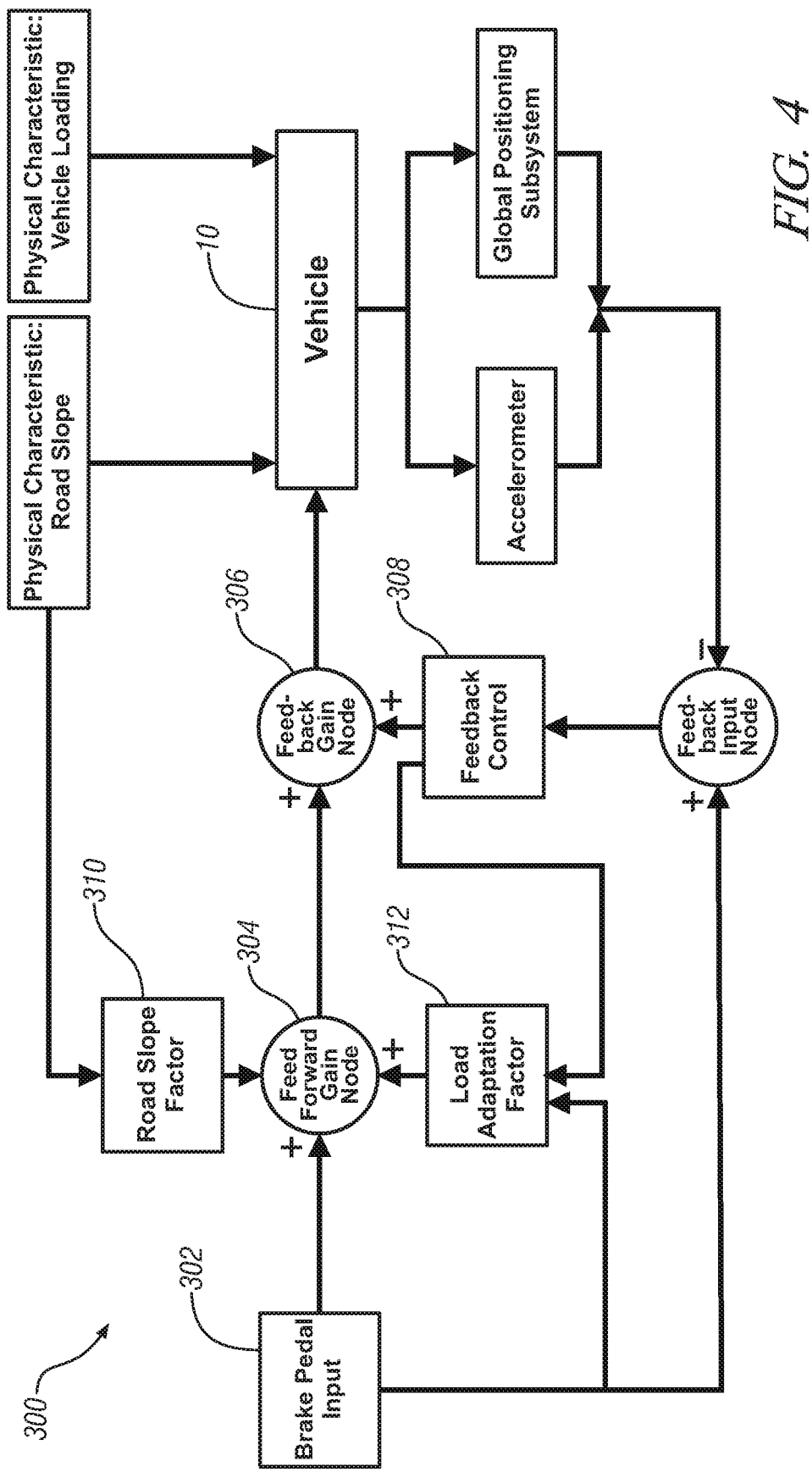
FIG. 4 is a block diagram illustrating an exemplary embodiment of a method of braking control in accordance with the present disclosure.

An exemplary embodiment of the algorithm used by brake control module 40 to implement the control methods discussed above is depicted in FIG. 4. Process 300 describes the control of braking system 20 by an algorithm in accordance with the present disclosure. Physical characteristics of road slope and vehicle loading act upon vehicle 10. At step 302, a brake pedal input is received from the operator. This brake pedal input is fed through a feed forward gain node at step 304 and a feedback gain node at step 306 in order to effect braking upon vehicle 10. The effects of the feedback gain node upon the braking input is determined at step 308, whereby, as previously described, the feedback control system receives inputs regarding braking performance data and applies a compensation factor to the brake pedal input on the basis of the performance data. The effects of the feed forward gain node are determined, as previously described, by the application of a road slope factor at step 310 and a load adaptation factor at step 312. In this way, factors regarding road slope and vehicle loading may be applied to braking system 20, through the use of feedback and feed forward mechanisms, such that the operation of braking system 20 produces a consistent relationship between brake pedal input and deceleration of the vehicle.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling braking in a vehicle comprising:
   receiving a brake pedal input;
   modulating said brake pedal input by a feedback gain and a feed forward gain to create a modulated brake pedal input; and
   braking said vehicle based upon said modulated brake pedal input;
   wherein said feed forward gain comprises a load adaptation factor automatically estimating an effect of a dynamic load upon said vehicle based upon said feedback gain and said brake pedal input, and
   wherein said modulated brake pedal input is operative to produce a consistent relationship between said brake pedal input and a deceleration of said vehicle.

2. The method of claim 1, wherein said feedback gain comprises deceleration data derived from accelerometer data.

3. The method of claim 1, wherein said feedback gain comprises deceleration data derived from global positioning data.

4. The method of claim 1, wherein said feedback gain comprises deceleration data derived from accelerometer data and from global positioning data.

5. The method of claim 1, wherein said feed forward gain comprises a road slope factor.

6. The method of claim 1, wherein said dynamic load comprises a non-nominal load of said vehicle.

7. The method of claim 1, wherein said load adaptation cycle is adjusted through a brake control adaptation cycle.

8. The method of claim 7, wherein said brake control adaptation cycle comprises a key cycle of said vehicle beginning when said vehicle is keyed on and ending when said vehicle is keyed off.

9. The method of claim 7, wherein said brake control adaptation cycle comprises an initial load adaptation factor based upon a nominal load of said vehicle and adjusts said load adaptation factor iteratively based upon a non-nominal load of said vehicle.

10. The method of claim 7, wherein said brake control adaptation cycle comprises an initial load adaptation factor based upon a last load of said vehicle from a previous brake control adaptation cycle and adjusts said load adaptation factor iteratively based upon a non-nominal load of said vehicle.

11. The method of claim 7, wherein said brake control adaptation cycle comprises a learning cycle comprising:
    adjusting said load adaptation factor during said learning cycle; and
    utilizing said adjusted load adaptation factor as a fixed value after said learning cycle.

12. The method of claim 1, wherein automatically estimating said effect of said dynamic load upon said vehicle comprises updating said dynamic load of said vehicle based solely upon signals internal to said vehicle during operation of said vehicle.

13. A braking control system comprising:
    a brake pedal system;
    a data system operative to generate vehicle data, said vehicle data operative to produce vehicle deceleration data and road slope data;
    a brake control module, said brake control module operative to:
        receive a brake pedal input from said brake pedal system;

calculate a feedback gain based upon said vehicle deceleration data;

calculate a feed forward gain based upon said road slope data and a load adaptation factor; and apply said feedback gain and said feed forward gain to said brake pedal input to generate a modulated brake pedal input; and a braking-torque generating system responding to said modulated brake pedal input; and wherein said load adaptation factor automatically estimates an effect of a dynamic load upon said vehicle based upon said feedback gain and said brake pedal input.

14. The system of claim 13, wherein said data system comprises an accelerometer.

15. The system of claim 14, wherein said data system further comprises a digital map device.

16. The system of claim 13, wherein said data system comprises a digital map device.

17. The system of claim 13, wherein said load adaptation factor is initially set to a pre-set lookup value.

18. The system of claim 13, wherein said load adaptation factor is initially set to a last value of said load adaptation factor utilized during a previous brake control adaptation cycle.

* * * * *